Sept. 26, 1950  HENRI-GEORGES DOLL  2,523,866
VIBRATION INSENSITIVE GALVANOMETER
Filed March 8, 1946  2 Sheets-Sheet 1
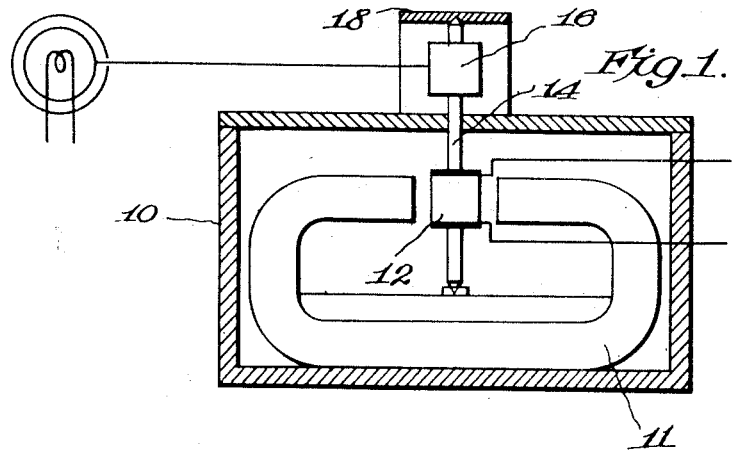
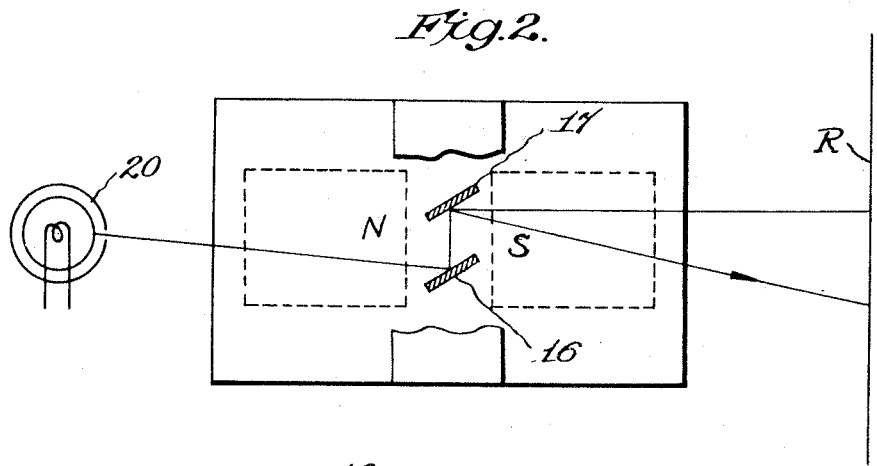
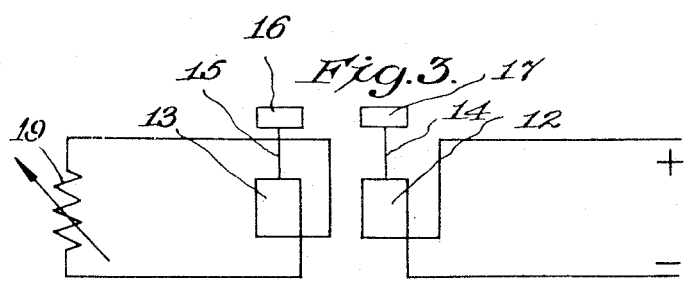
INVENTOR.
HENRI-GEORGES DOLL
BY
Hoguet, Neary & Campbell
his ATTORNEYS Sept. 26, 1950  HENRI-GEORGES DOLL  2,523,866
VIBRATION INSENSITIVE GALVANOMETER
Filed March 8, 1946  2 Sheets-Sheet 2

INVENTOR.
HENRI-GEORGES DOLL
BY
Hoguet, Neary & Campbell
his ATTORNEYS

Patented Sept. 26, 1950

2,523,866

UNITED STATES PATENT OFFICE 2,523,866

VIBRATION INSENSITIVE GALVANOMETER

Henri-Georges Doll, Houston, Tex., assignor to Schlumberger Well Surveying Corporation, Houston, Tex., a corporation of Delaware Application March 8, 1946, Serial No. 653,185

5 Claims. (Cl. 171—95)

This invention relates to improvements in measuring instruments that are capable of indicating or recording the value of a variable quantity, and it relates particularly to improvements in galvanometers of the type used in recording and indicating devices whereby an indication or record of a variable electrical value is obtained by deflection of a light beam relatively to a scale or to a light sensitive record strip or film.

It has been recognized that highly sensitive galvanometers and other types of measuring instruments having a rotary or pivotally mounted member responsive to variations in the value of the quantity being measured are also sensitive to mechanical vibrations. In order to prevent inaccurate operation of, and damage to, such galvanometers, for example, they have been mounted rigidly and in such a manner as to shield them from vibration. It is not difficult to shield galvanometers from vibration in a laboratory for the reason that they can be mounted permanently on rigid foundations, thereby suppressing shock and vibration. However, for many purposes and under many conditions, it is impossible to provide such rigid and shielding supports. For example, in geophysical surveying, such as in well logging operations where galvanometers are used, the equipment may be mounted on a truck for transportation from place to place. The truck, in addition to carrying the electrical equipment including galvanometer recorders, usually has a cable winch by means of which electrodes and other equipment are lowered into and moved along the bore hole.

When the truck motor and the winch are operating, the truck vibrates and, therefore, it is customary to support the electrical equipment, especially the recorders, upon jacks that may be extended to engage the earth and lift the recorders out of engagement with the vehicle. This arrangement is not entirely satisfactory for the reason that the truck vibrates and the vibrations may be so intense as to shake the ground in the immediate vicinity of the truck, thereby adversely affecting the accuracy of the recording galvanometers.

Also, oil wells are drilled beneath the surface of lakes or bays and in order to survey such wells, it is necessary to mount the equipment on boats or barges. Rough weather is often encountered during the well logging operations and, as a consequence, the recorders which must be carried by the boat or barge are subjected to vibration and turning movement.

The effects of straight line vibrations have been overcome, to a large extent, by the use of galvanometers of the type disclosed in the Chilowsky Patent No. 2,024,966. The moving parts of the Chilowsky galvanometers are immersed in a liquid of the same density as the moving parts. Thus, when the Chilowsky galvanometers are subjected to straight line vibrations, the liquid and the moving elements do not move relatively and unwanted deflections of the indicating elements do not take place. The Chilowsky type of galvanometer is insensitive to all types of vibration except those that cause angular acceleration of the galvanometer about an axis parallel to the axis of rotation of the galvanometer coil. When the galvanometer is subjected to this type of vibration, the galvanometer case is rotated while the sensitively supported mirror and coil assembly, because of its inertia, will not be able to follow completely the rotation of the case so that a false indication will result.

Many devices or systems in which sensitive galvanometers are used are subject to angular acceleration, for example, in aircraft, boats and other vehicles. Even the Chilowsky type of galvanometer is not completely satisfactory for use in these devices.

An object of the present invention is to provide measuring instruments having pivotally or rotatably mounted indicating elements that are substantially completely insensitive to all angular accelerations about axes parallel with the axes of pivotal or rotary movements of the indicating elements.

Another object of the invention is to provide galvanometers for recorders that will produce accurate records even while being subjected to vibrations of all kinds.

Other objects of the invention will become apparent from the following description of galvanometers embodying the present invention.

Galvanometers of the type embodying the present invention are characterized by multiple mirrors, one of these mirrors being deflected by angular accelerations as well as by variations in the value of electrical energy from a source to which the galvanometer is connected, while the other mirror or mirrors may be deflected only by such angular accelerations, whereby deflections of the mirrors by angular accelerations act to nullify the effect of such angular accelerations.

More particularly, the new galvanometers may include two identical coil and mirror assemblies or two complete identical galvanometers that are provided with mirrors disposed in such relationship that a beam of light will be reflected from one mirror to the other and then to a recording surface. One of the galvanometers or coil assemblies is connected to a source of electrical energy to provide indications of the value of the energy, while the other coil assembly or galvanometer preferably is not energized and is solely responsive to angular acceleration. However, both of the coil assemblies or both galvanometers may be connected to the source of electrical energy, but in this case, the connections are such that the mirrors are deflected in opposite directions.

Inasmuch as the two movable galvanometer elements have identical characteristics, any angular acceleration to which they are subjected will cause equal deflections in the same direction of the two corresponding mirrors. When the mirrors are arranged properly, the deflections caused by angular acceleration will offset each other and the light beam will not be substantially displaced with respect to the record surface. On the other hand, when the value of the electrical energy varies, the mirrors will be deflected unequally or in opposite directions and the change in angular relationship between the mirrors will cause deflection of the light beam relatively to the record surface.

The moving elements, for example, the coils of the galvanometer or the separate galvanometers may be immersed in liquid of the same density as the moving elements in accordance with the disclosure of the Chilowsky Patent No. 2,024,966 and are not sensitive to vibrations of other kinds. Therefore, a galvanometer having a multiple mirror arrangement or a pair of galvanometers, one of which is a dummy, or is arranged for opposite deflection of its mirror by a change in the value of the electrical energy, in accordance with the present invention may be made substantially insensitive to all types of vibration that they can withstand without damage.

For a better understanding of the present invention, reference may be had to the accompanying drawings in which:

Figure 1 is a diagrammatic showing, in vertical section, of a typical form of galvanometer embodying the present invention;

Figure 2 is a plan view of the galvanometer, partly broken away to disclose details thereof;

Figure 3 is a diagrammatic illustration of the electrical circuit of the galvanometer;

Figure 4:
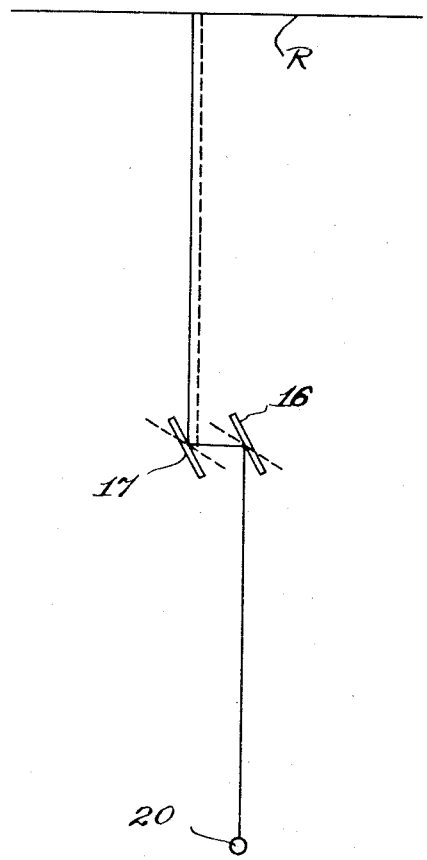
Figures 4 and 5 are diagrammatic showings of the action of the mirrors in controlling the direction of the light beam.

The galvanometer, including the magnet and coil arrangements, may be of any desired construction and, inasmuch as the magnet and coil arrangements of such galvanometers are well understood in the art, only diagrammatic showings of these elements are included in the drawings.

Illustrative of the invention, the galvanometer disclosed in Figures 1 and 2 may include a liquid-tight casing 10 within which is mounted a C-shaped magnet 11 having opposed north and south poles defining a gap therebetween.

Between the poles of the magnet 11 are rotatably mounted a pair of galvanometer coils 12 and 13 which are of conventional construction and which are mounted on the spindles 14 and 15 (Figure 3) that are suitably mounted in bearings to permit free rotation of the coils. It will be understood that springs (not shown) will be provided for returning the coils to their initial positions. It will be understood that other types of suspensions for the coils 12 and 13 may be used instead of the spindles and the springs. For example, ribbons may be connected to the top and bottom of each coil which furnish support for the coils and torque for returning the coils to a reference position, as well as forming electrical connections to the coils. The spindles 14 and 15 are provided near their upper end with the mirrors 16 and 17, respectively, for rotation with the coils 12 and 13. The upper ends of the spindles 14 and 15 may be journalled with suitable bearings in a bracket 18 fixed to the top of the galvanometer casing 10. The casing 10 may be filled with a liquid of the same density as the coils and shafts, for example, perchloroethylene, which, as disclosed in the Chilowsky patent, will reduce unwanted deflection of the mirrors by straight line vibrations. Under some conditions, for example, when only angular acceleration is present, the liquid can be omitted from the casing.

The mirrors 16 and 17 and the coils and supporting elements are electrically and mechanically identical, that is, these assemblies are balanced statically and dynamically and are of the same shape, size and have the same characteristics throughout. Also, the coils 12 and 13 are preferably electrically identical so that they will have the same damping properties under all conditions. The coil 13 may be connected to a variable resistance 19 externally of the case 10 and adjusted so that its electrical damping characteristics are the same as those of the coil 12 which is connected to the source of electrical energy, the value of which is to be recorded.

If the mechanical damping of the two coils is not identical, the resistance 19 may be adjusted to render the overall damping characteristics of the coils more nearly identical.

If desired, the coil 13 can be replaced with another element that has the same dynamic characteristics as the coil 12. This is particularly so in the case of a liquid filled galvanometer wherein the damping may be almost entirely provided by the viscosity of the liquid and the electrical damping is practically negligible.

Inasmuch as the coil assemblies and the mirrors are electrically and mechanically identical, they will partake of identical movements upon angular acceleration of the case 10 about any axis parallel to the axes of the shafts 14 and 15. Accordingly, if the case 10 is subjected to angular acceleration, both of the mirrors will be deflected equally and a light beam from a source 20 falling, for example, on the mirror 16 at about its axis will be deflected relatively to the other mirror, but this other mirror in turn will be deflected an equal amount so that the emergent beam from the mirror 17 will strike substantially the same point on the record or indicator surface R. A minor error may occur due to the fact, as illustrated in Figure 4, that the reflected beam from the mirror 16 may not strike exactly on the axis of the mirror 17 and thus may emerge from a different place which is displaced slightly from the axis of the mirror 17, as shown in an exaggerated manner in dotted lines in Figure 4. This displacement of the light beam, which simply is an error in parallax, is so small in practice as to be negligible.

The above described conditions will be maintained so long as the mirror 17 is not deflected by a change in the electrical energy supplied to it. Upon a variation in the value of the electrical energy supplied to the coil 12, the angular position of the mirror 17 with respect to the mirror 16 will be changed, with the result that the light beam will be deflected relatively to the record surface R. If, during a change in the electrical value supplied to the coil 12, there is an angular acceleration of the galvanometer casing 10, both mirrors will be deflected equally, but the beam will not be substantially displaced along the record surface R by such angular acceleration.

Figure 5:
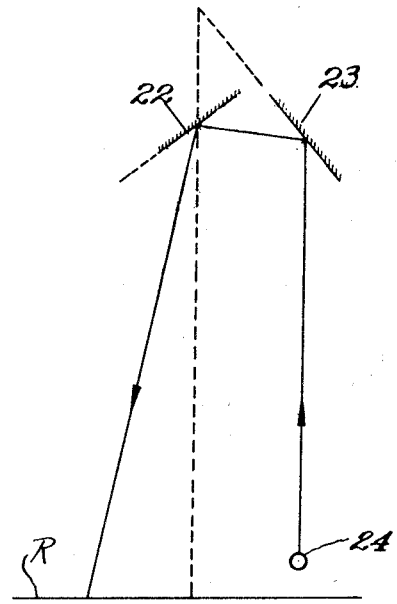

While the galvanometer has been illustrated in Figures 2 and 4 as having the mirrors parallel, it will be understood that the relative angularity of the mirrors may be varied as desired. Thus, as shown in Figure 5, the mirrors 22 and 23 may be arranged at a right angle so that the light beam is reflected back substantially parallel to the beam of light emerging from the light source 24. The light beam may be directed at any other angle as the purpose demands. Thus, the angular relationship of the mirrors can be set by the manufacturer to fulfill requirements.

While it is desirable from the standpoint of ease of manufacture and compactness to mount the dummy coil 13 and the indicating coil 12 within the same casing and between the poles of the same magnet, it will be understood that similar results may be obtained by using two separate galvanometers having identical mechanical and electrical characteristics. In this case, one of the galvanometers may be a dummy and the other is connected to the source of electrical energy. Both galvanometers are sensitive to angular acceleration and have their mirrors so arranged that any deflection of the mirrors of both by angular acceleration are such as to compensate for, or nullify the effect of, such angular accelerations.

Figure 6:
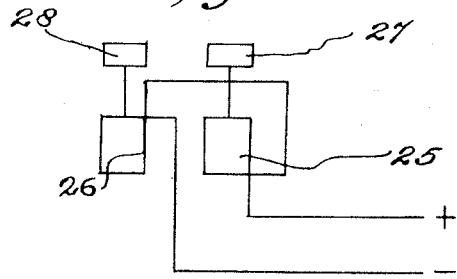
Figure 6 is a diagrammatic illustration of the electrical circuit of a modified form of galvanometer.

As shown in Figure 6, both of the galvanometer coils 25 and 26 may be connected to the source of electrical energy to be measured, but the coils should be connected so that they are deflected in opposite directions by a change in the value of the electrical energy. The movement of both of the mirrors 27 and 28 substantially doubles the displacement of the beam relative to the record surface which may be advantageous in recording small changes in value.

In some cases it may be desirable to have more than two coil and mirror assemblies or more than two galvanometers and these arrangements may be provided following the principles outlined above.

From the preceding description of typical forms of galvanometers embodying the present invention, it will be understood that galvanometers may be provided which are insensitive to all types of vibrations and angular acceleration and thus are entirely satisfactory for use in aircraft, trains, trucks, boats and other vehicles, as well as installations where vibration is present and cannot readily be avoided. Moreover, the invention can be used with other types of devices which have their accuracy affected by angular acceleration, for example, weighing balances, sensitive testing devices and the like which have a pivotally or rotatably mounted element that is deflected by a change in the value of a quantity being measured or determined.

It will be understood further that the devices of the type embodying the invention are susceptible to considerable modification so long as assemblies responsive to angular acceleration have identical dynamic characteristics. Therefore, the forms of the invention described above should be considered as illustrative of the invention and not as limiting the scope of the following claims.

I claim:

1. A galvanometer comprising at least two movable elements having substantially identical dynamic characteristics rotatively mounted on substantially parallel axes adjacent to each other, means for connecting only one of said moving element assemblies to a source of electrical energy, a source-free electrical circuit connected to the other of said movable elements, and mirrors carried by and rotatable with said moving elements for reflecting a beam of light from one mirror to the other and from the latter to a surface, whereby the deflection of the beam of light reflected from said other mirror to the surface will be proportional to electrical energy from said source and independent of spurious externally caused accelerations about axes parallel to the axes of said movable elements.

2. A galvanometer comprising a pair of coil assemblies having substantially identical dynamic characteristics and having substantially parallel axes of rotation, a mirror carried by each coil assembly, said mirrors being angularly related to reflect a beam of light from one to the other and from the latter to a surface, whereby said coil assemblies and mirrors are equally deflected by angular acceleration about axes parallel with the axes of said coil assemblies, means for connecting only one of said coil assemblies to a source of electrical energy, the value of which is to be determined, and a source-free electrical circuit connected to the other of said coil assemblies, said circuit having substantially the same electrical damping characteristics as the circuit of said one coil assembly, whereby the deflection of the beam of light reflected from said other mirror to the surface will be proportional only to electrical energy from said source and independent of spurious externally caused accelerations about axes parallel to the axes of said coil assemblies.

3. A galvanometer comprising a pair of galvanometer coil assemblies having substantially identical dynamic characteristics and having substantially parallel axes of rotation, said coil assemblies being immersed in a liquid having substantially the same density of said coil assemblies, a mirror carried by each coil assembly, said mirrors being angularly related to reflect a beam of light from one to the other and from the latter to a surface, whereby said coil assemblies and mirrors are equally deflected by angular accelerations about axes parallel with the axes of said coil assemblies, means for connecting only one of said coil assemblies to a source of electrical energy, the value of which is to be determined, and a source-free electrical circuit connected to the other of said coil assemblies, said circuit having substantially the same electrical damping characteristics as the circuit of said one coil assembly, whereby the deflection of the beam of light reflected from said other mirror to the surface will be proportional to electrical energy from said source and independent of spurious externally caused accelerations about axes parallel to the axes of said coil assemblies.

4. A galvanometer comprising rotatable coil assemblies having similar dynamic characteristics, means for connecting only one of said coil assemblies to a source of electrical energy, a source-free electrical circuit including a variable resistance electrically connected across the other coil assembly to render its damping characteristics substantially identical with those of said one coil assembly, and angularly related mirrors carried by and movable with said coil assemblies for reflecting a beam of light from one of said mirrors to the other and from the latter to a surface.

5. A galvanometer for recorders having a recording surface, comprising a first galvanometer coil assembly mounted for rotation about an axis, means for connecting said galvanometer coil assembly to a source of electrical energy the value of which is to be recorded, a second dummy galvanometer coil assembly having the same dynamic characteristics as said first galvanometer coil assembly and mounted for rotation about another axis, mirrors movable with said first and second galvanometer coil assemblies, respectively, said mirrors being angularly related to reflect a light beam from one mirror to the other and from said other mirror to said recording surface, and a source-free electrical circuit electrically connected to said dummy galvanometer coil assembly.

HENRI-GEORGES DOLL.

REFERENCES CITED

The following references are of record in the file of this patent:

UNITED STATES PATENTS

| Number | Name | Date |
| --- | --- | --- |
| 2,024,966 | Chilowsky | Dec. 17, 1935 |
| 2,267,356 | Ritzmann | Dec. 23, 1941 |
| 2,294,320 | Ritzmann | Aug. 25, 1942 |

FOREIGN PATENTS

| Number | Country | Date |
| --- | --- | --- |
| 749,767 | France | July 29, 1933 |